(12) United States Patent
Jo et al.

(10) Patent No.: US 12,441,294 B2
(45) Date of Patent: Oct. 14, 2025

(54) ELECTRIFIED VEHICLE AND METHOD FOR CONTROLLING A REGENERATIVE BRAKING AMOUNT THEREOF

(71) Applicants: HYUNDAI MOTOR COMPANY, Seoul (KR); KIA CORPORATION, Seoul (KR)

(72) Inventors: Min Gyun Jo, Ansan-si (KR); Jae Young Choi, Seoul (KR); Gwang Il Du, Ansan-si (KR); Han Nah Song, Daejeon (KR); Chun Hyuk Lee, Seongnam-si (KR); Hoon Han, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 138 days.

(21) Appl. No.: 18/076,135

(22) Filed: Dec. 6, 2022

(65) Prior Publication Data
US 2024/0010184 A1    Jan. 11, 2024

(30) Foreign Application Priority Data
Jul. 6, 2022    (KR) .......................... 10-2022-0083286

(51) Int. Cl.
*B60W 20/14* (2016.01)
*B60W 10/10* (2012.01)
(Continued)

(52) U.S. Cl.
CPC ............ *B60W 20/14* (2016.01); *B60W 10/10* (2013.01); *B60W 10/18* (2013.01);
(Continued)

(58) Field of Classification Search
CPC ...... B60W 20/14; B60W 10/10; B60W 10/18; B60W 30/18127; B60W 2552/15; B60W 2554/80
See application file for complete search history.

(56) References Cited

U.S. PATENT DOCUMENTS 6,033,041 A * 3/2000 Koga ........................ B60L 7/18
303/192
10,377,244 B2   8/2019 Kim et al.
(Continued)

FOREIGN PATENT DOCUMENTS

JP           4539374 B2    7/2010
JP           4830680 B2    9/2011
(Continued)

*Primary Examiner* — Todd Melton
*Assistant Examiner* — Matthew Ho
(74) *Attorney, Agent, or Firm* — Lempia Summerfield Katz LLC

(57) ABSTRACT

A method of controlling an electrified vehicle may include determining a traveling environment level; determining a regenerative braking continuation range and a regenerative braking retention amount according to the traveling environment level when a preset deceleration condition is satisfied; and determining whether to maintain a regenerative braking amount as the regenerative braking retention amount based on whether a vehicle speed is included in the regenerative braking continuation range when the vehicle speed is lower than or equal to a preset regenerative braking termination vehicle speed.

16 Claims, 7 Drawing Sheets

(51) Int. Cl.
*B60W 10/18* (2012.01)
*B60W 30/18* (2012.01)

(52) U.S. Cl.
CPC ... *B60W 30/18127* (2013.01); *B60W 2552/15* (2020.02); *B60W 2554/80* (2020.02)

(56) References Cited

U.S. PATENT DOCUMENTS

| | | | | |
|---|---|---|---|---|
| 2013/0289809 | A1* | 10/2013 | Treharne | B60L 3/0046 |
| | | | | 180/65.285 |
| 2021/0101598 | A1 | 4/2021 | Kim | |
| 2021/0213835 | A1* | 7/2021 | Yamamoto | F16D 61/00 |

FOREIGN PATENT DOCUMENTS

| | | | |
|---|---|---|---|
| JP | 2015196474 A | 11/2015 | |
| JP | 2019116253 A | 7/2019 | |
| JP | 2020147078 A | 9/2020 | |
| KR | 20210041421 A | 4/2021 | |

\* cited by examiner

ELECTRIFIED VEHICLE AND METHOD FOR CONTROLLING A REGENERATIVE BRAKING AMOUNT THEREOF

CROSS-REFERENCE TO RELATED APPLICATION

This application claims priority to and the benefit of Korean Patent Application No. 10-2022-0083286, filed on Jul. 6, 2022, the entire contents of which are incorporated herein by reference.

BACKGROUND

1. Technical Field

The present disclosure relates to an electrified vehicle capable of improving fuel efficiency and being stably braked by controlling a regenerative braking amount according to traveling environments upon deceleration, and a method of controlling the same.

2. Related Art

Recently, with increasing interest in the environment, eco-friendly vehicles having an electric motor as a power source tend to increase. The eco-friendly vehicle is also called an electrified vehicle, and as a typical example, includes a hybrid electric vehicle (HEV), a plug-in hybrid electric vehicle (PHEV), an electric vehicle (EV), a fuel cell electric vehicle (FCEV), and the like.

A method of braking the electrified vehicle includes a hydraulic braking method using a hydraulic brake, a regenerative braking method using an electric motor, and the like. The regenerative braking method is a method in which the electric motor uses kinetic energy of a wheel to charge a battery, thereby decelerating the vehicle.

In general, when a vehicle speed of the electrified vehicle is reduced to a regenerative braking termination vehicle speed or less, the electrified vehicle terminates the regenerative braking while replacing the regenerative braking amount with a hydraulic braking amount for stable braking. Here, the regenerative braking termination vehicle speed is set in consideration of the hydraulic braking responsiveness, and the hydraulic braking responsiveness means a time which it takes for the hydraulic brake to exert a predetermined hydraulic braking force.

When the regenerative braking termination vehicle speed is set low, fuel efficiency may increase as regenerative braking energy increases, but when decelerating, a problem may occur in braking stability depending on the traveling environments of the vehicle.

The information explained in this BACKGROUND section is provided only to enhance understanding of the background of the present disclosure and should not be taken as acknowledging that they correspond to the related art already known to those having ordinary skill in the art.

SUMMARY

The present disclosure improves fuel efficiency through increased regenerative braking energy, and stably brakes the vehicle regardless of traveling environments by maintaining a regenerative braking amount for a predetermined section based on the traveling environments in a section where the regenerative braking amount is replaced with a hydraulic braking amount depending on the deceleration of the vehicle.

Objects of the present disclosure are not limited to the above-described objects, and other objects not mentioned should be clearly understood by those having ordinary skill in the art to which the present disclosure pertains from the following description.

According to one embodiment of the present disclosure, a method of controlling an electrified vehicle may include: determining a traveling environment level; determining a regenerative braking continuation range and a regenerative braking retention amount according to the traveling environment level when a preset deceleration condition is satisfied; and determining whether to maintain a regenerative braking amount as the regenerative braking retention amount based on whether a vehicle speed is included in the regenerative braking continuation range when the vehicle speed is lower than or equal to a preset regenerative braking termination vehicle speed.

In another embodiment of the present disclosure, an electrified vehicle may include: a regenerative braking control unit configured to determine a regenerative braking continuation range and a regenerative braking retention amount according to a traveling environment level when a preset deceleration condition is satisfied; and a regenerative braking calculation unit configured to determine whether to maintain a regenerative braking amount as the regenerative braking retention amount based on whether a vehicle speed is included in the regenerative braking continuation range when the vehicle speed is lower than or equal to a preset regenerative braking termination vehicle speed.

According to the present disclosure, it is possible to improve fuel efficiency through increased regenerative braking energy, and stably brake the vehicle regardless of traveling environments by maintaining the regenerative braking amount for the predetermined section based on the traveling environments in the section where the regenerative braking amount is replaced with the hydraulic braking amount depending on the deceleration of the vehicle.

The effects obtainable in the present disclosure are not limited to the above-described effects, and other effects not mentioned may be clearly understood by those having ordinary skill in the art to which the present disclosure pertains from the following description.

BRIEF DESCRIPTION OF THE DRAWINGS

The above and other objects, features and other advantages of the present disclosure should be clearly understood from the following detailed description when taken in conjunction with the accompanying drawings, in which.

DETAILED DESCRIPTION

Figure 1:
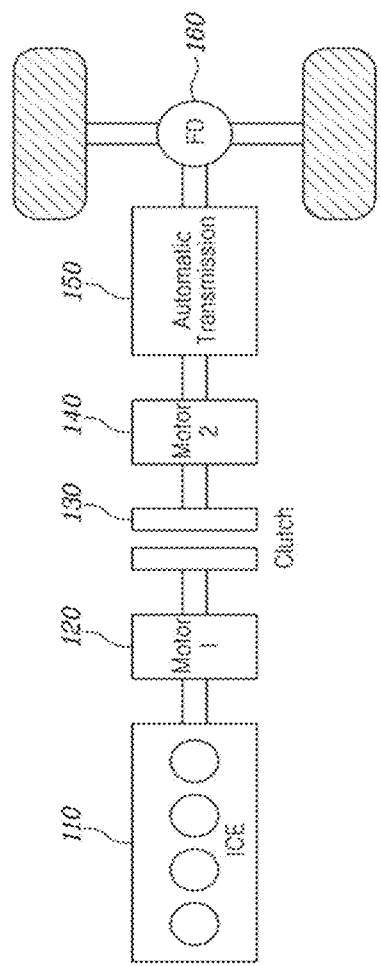
FIG. 1 shows a configuration of a power train of a hybrid electric vehicle according to one embodiment of the present disclosure.

Hereinafter, embodiments disclosed in this specification are described in detail with reference to the accompanying drawings, but the same or similar components are given the same reference numerals regardless of reference numerals, and overlapping descriptions thereof have been omitted. The suffixes "module" and "unit" for the components used in the following description are given or interchangeably used in consideration of only ease of preparing the specification, and do not have distinct meanings or roles by themselves. In addition, in describing the embodiments disclosed in this specification, when it is determined that detailed descriptions of related known technologies may obscure the gist of the embodiments disclosed in this specification, the detailed description thereof has been omitted. In addition, the accompanying drawings are only for easy understanding of the embodiments disclosed in this specification, and it should be understood that the technical spirit disclosed herein is not limited by the accompanying drawings, and include all changes, equivalent, and substitutes included in the spirit and technical scope of the present disclosure.

Terms including an ordinal number, such as first or second, may be used to describe various components, but the components are not limited by the terms. The above terms are used only for the purpose of distinguishing one component from another.

When a certain component is described as being "connected" or "joined" to another component, it should be understood that the certain component may also be directly connected or joined to another component, but other components may be present therebetween. On the other hand, it should be understood that when it is described that a certain component is "directly connected" or "directly joined" to another component, other components are not present therebetween.

The singular expression includes the plural expression unless the context clearly dictates otherwise. When a component, device, element, or the like of the present disclosure is described as having a purpose or performing an operation, function, or the like, the component, device, or element should be considered herein as being "configured to" meet that purpose or to perform that operation or function.

In this specification, it should be understood that terms such as "comprises" or "have" are intended to designate that the features, numbers, steps, operations, components, parts, or combinations thereof described in the specification are present, and do not preclude the possibility of the presence or addition of one or more other features, numbers, steps, operations, components, parts, or combinations thereof in advance.

In addition, a unit or control unit included in names such as a motor control unit (MCU), a hybrid control unit (HCU), and the like is only a term widely used in the naming of a controller for controlling a vehicle specific function, and does not mean a generic function unit. For example, each controller may include a communication device for communicating with other controllers or sensors to control functions in charge, a memory for storing an operating system or logic commands and input/output information, and one or more processors for performing the determination, operation, and decision necessary for controlling the functions in charge.

Before describing the configuration of the braking control system and the braking control method of the electrified vehicle according to the embodiments of the present disclosure, the structure and control system of the electrified vehicle applicable to the embodiments are first described.

Although the embodiments below are described with reference to the hybrid electric vehicle (HEV) among electrified vehicles, the present disclosure is not limited thereto, and may also be implemented as a plug-in hybrid electric vehicle (PHEV), an electric vehicle (EV), a fuel cell electric vehicle (FCEV) or the like, which may obtain regenerative braking energy through an electric motor. In addition, when a shift stage prohibition control of a transmission to be described below is applied to the electrified vehicle according to this embodiment, the electrified vehicle needs to be provided with the transmission.

FIG. 1 shows a configuration of a power train of a hybrid electric vehicle according to one embodiment of the present disclosure.

FIG. 1 shows that a power train of a hybrid electric vehicle adopting a parallel type hybrid system in which two motors 120 and 140 and an engine clutch 130 are mounted between an internal combustion engine 110 and a transmission 150. The parallel type hybrid system is also called a transmission mounted electric drive (TMED) hybrid system because the second motor 140 is always connected to an input terminal of the transmission 150.

Here, a first motor 120 of the two motors 120 and 140 is disposed between the engine 110 and one end of the engine clutch 130, and an engine shaft of the engine 110 and the first motor shaft of the first motor 120 may be directly interconnected to rotate together at all times.

One end of a second motor shaft of the second motor 140 may be connected to the other end of the engine clutch 130, and the other end of the second motor shaft may be directly connected to the input end of the transmission 150. The second motor 140 may be selectively connected to the first motor 120 according to a traveling mode.

The second motor 140 may have a greater output than that of the first motor 120, and the second motor 140 may function as a drive motor. In addition, the first motor 120 performs a function of a starter motor for cranking the engine 110 when the engine 110 is started, and when the engine is off, the rotation energy of the engine 110 may be recovered through power generation, and the power generation may also be performed with the power of the engine 110 in a state in which the engine 110 is in operation.

When a driver depresses an accelerator pedal after starting (e.g., HEV Ready) in the hybrid electric vehicle having a power train as shown in FIG. 1, the second motor 140 is first driven by using power of a battery (not shown) in a state in which the engine clutch 130 is off. Accordingly, the power of the second motor 140 moves wheels through the transmission 150 and a final drive (FD) 160 (i.e., EV mode). When the vehicle gradually accelerates and a greater driving force is required, the first motor 120 may operate to crank the engine 110.

After the engine 110 is started, when a difference in a rotation speed between the engine 110 and the second motor 140 is within a certain range, the engine clutch 130 is finally engaged and the engine 110 and the second motor 140 are rotated together (i.e., transition from the EV mode to an HEV mode). Accordingly, an output of the second motor 140 may be decreased and the output of the engine 110 may be increased through a torque blending process to satisfy a driver's required torque. In the HEV mode, the engine 110 may satisfy most required torques, and a difference between the engine torque and the required torque may be compensated through at least one of the first motor 120 and the second motor 140. For example, when the engine 110 outputs a torque higher than the required torque in consideration of the efficiency of the engine 110, the first motor 120 or the second motor 140 generates power by an engine torque surplus. When the engine torque is smaller than the required torque, at least one of the first motor 120 and the second motor 140 may output a torque corresponding the shortage of the required torque (e.g., a supplemental torque).

When a preset engine off condition such as deceleration of the vehicle is satisfied, the engine clutch 130 is open and the engine 110 is stopped (i.e., transition from the HEV mode to the EV mode). Upon deceleration, the battery is charged through the second motor 140 using the driving force of the wheel, which is referred to as braking energy regeneration or regenerative braking.

In general, the transmission 150 may be a stepwise variable transmission or a multi-plate clutch, for example, a dual-clutch transmission (DCT).

Figure 2:
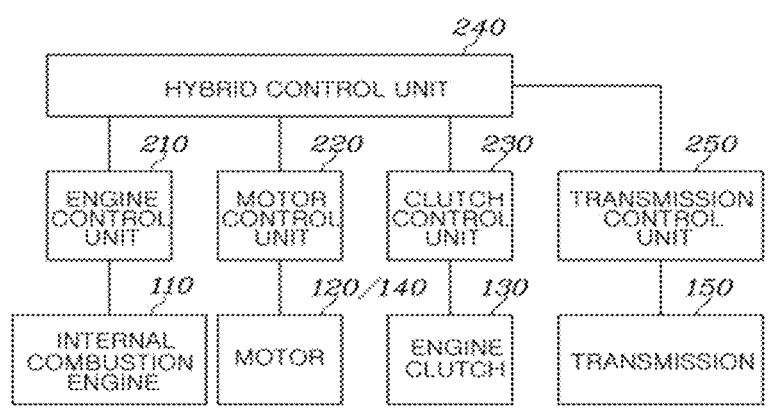
FIG. 2 shows a configuration of a control system of the hybrid electric vehicle according to one embodiment of the present disclosure.

FIG. 2 shows a configuration of a control system of the hybrid electric vehicle according to one embodiment of the present disclosure.

Referring to FIG. 2, in the hybrid electric vehicle to which embodiments of the present disclosure may be applied, the internal combustion engine 110 may be controlled by an engine control unit 210, and torques of the first motor 120 and the second motor 140 may be controlled by a motor control unit (MCU) 220. The engine clutch 130 may be controlled by a clutch control unit 230. Here, the engine control unit 210 is also called an engine management system (EMS). In addition, the transmission 150 is controlled by a transmission control unit 250.

The motor control unit 220 controls a gate drive unit (not shown) with a control signal in the form of a pulse width modulation based on a motor angle, phase voltage, phase current, required torque, and the like of each of the motors 120 and 140, and the gate drive unit may control an inverter (not shown) configured to drive each of the motors 120 and 140 accordingly.

Each controller may be connected to the hybrid control unit (HCU) 240 configured to control the overall power train including a mode switching process as an upper controller to provide a change in a traveling mode, information necessary for controlling an engine clutch upon gear shift, and/or information necessary for controlling an engine stop to the hybrid control unit 240 or perform an operation according to the control signal under a control of the hybrid control unit 240.

For example, the hybrid control unit 240 determines whether to perform a switching between EV and HEV modes or CD and CS modes (in the case of PHEV) according to the driving state of the vehicle. To this end, the hybrid control unit 240 determines whether the engine clutch 130 is open. When the engine clutch 130 is open, the hybrid control unit 240 performs a hydraulic control. In addition, the hybrid control unit 240 may determine a state (lock-up, slip, open, or the like) of the engine clutch 130, and control a time point at which the fuel injection of the engine 110 is stopped. In addition, the hybrid control unit 240 may control the recovery of engine rotation energy by transmitting a torque command for controlling a torque of the first motor 120 to the motor control unit 220 for an engine stop control. In addition, the hybrid control unit 240 may determine a state of each of drive sources 110, 120, and 140 in order to satisfy the required torque, and thus determine a required drive force to be shared by each of the drive sources 110, 120, and 140 to transmit the torque command to the control units 210 and 220 configured to control each of the drive sources.

Of course, it is apparent to those skilled in the art that the connection relationship between the above-described control units and the function/classification of each control unit are illustrative and are not limited to their names. For example, the hybrid control unit 240 may also be implemented so that the corresponding function is replaced and provided from any one of other control units other than itself, and the corresponding function may also be dispersed and provided from two or more of other control units.

It should be apparent to those having ordinary skill in the art that the above-described configuration of FIGS. 1 and 2 is only one configuration example of the hybrid electric vehicle, and the hybrid electric vehicle applicable to the embodiment is not limited to this structure.

Hereinafter, a hybrid electric vehicle capable of improving fuel efficiency and being stably braked by controlling the regenerative braking amount according to the traveling environments upon deceleration is described.

Figure 3:
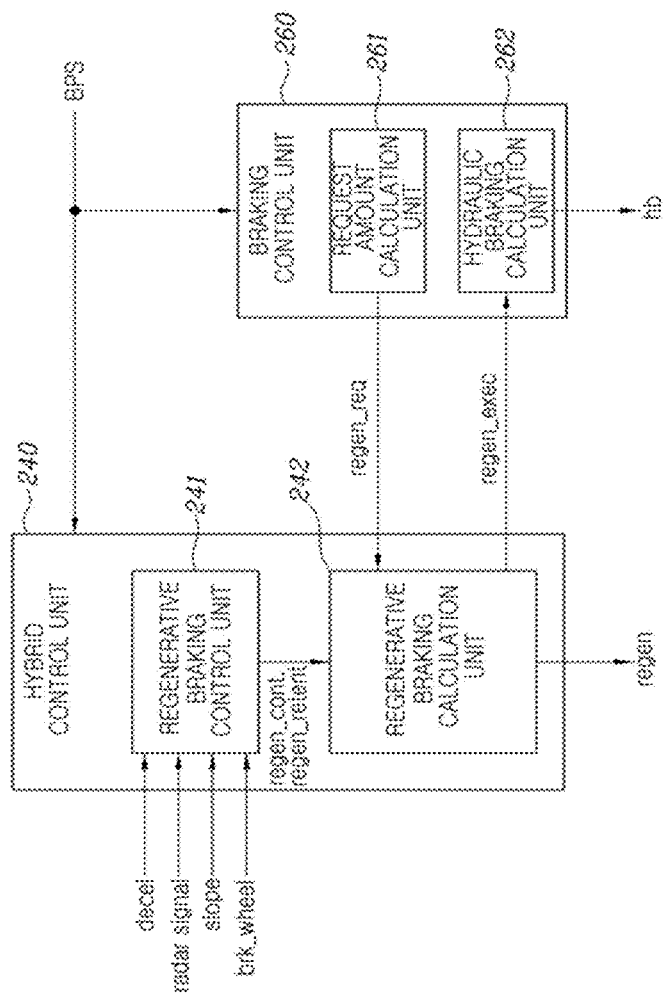
FIG. 3 shows a configuration of a braking control system of the hybrid electric vehicle according to one embodiment of the present disclosure.

FIG. 3 shows a configuration of a braking control system of the hybrid electric vehicle according to one embodiment of the present disclosure.

Referring to FIG. 3, the hybrid electric vehicle may include a hybrid control unit 240 and a braking control unit 260 configured to divide a braking demand amount according to a brake pedal operation amount (BPS) into a regenerative braking amount "regen" and a hydraulic braking amount "hb".

In the hybrid electric vehicle, when a vehicle speed is smaller than or equal to a preset regenerative braking termination vehicle speed, the regenerative braking amount "regen" may be replaced with the hydraulic braking amount "hb" for stable braking. Here, the regenerative braking termination vehicle speed represents a vehicle speed entering a regenerative braking termination range, and may be set in consideration of hydraulic braking responsiveness. The termination vehicle speed of the regenerative braking termination range may be set to zero "0" (kph).

This embodiment proposes the hybrid electric vehicle, which can improve fuel efficiency through increased regenerative braking energy and can be stably braked regardless of the traveling environments by maintaining the regenerative braking amount regen for a predetermined section based on the traveling environments in the regenerative braking termination range in which the regenerative braking amount regen is replaced with the hydraulic braking amount hb as the vehicle decelerates.

The hybrid control unit 240 may include a regenerative braking control unit 241 and a regenerative braking calculation unit 242.

The regenerative braking control unit 241 may determine a regenerative braking continuation range "regen_cont" and a regenerative braking retention amount "regen_retent" based on the traveling environments of the vehicle. The regenerative braking continuation range "regen_cont" may be included in the regenerative braking termination range. In other words, the entrance vehicle speed of the regenerative braking continuation range "regen_cont" may be slower than the regenerative braking termination vehicle speed, and the termination vehicle speed of the regenerative braking continuation range "regen_cont" may be higher than zero "0" (kph). The regenerative braking retention amount "regen_retent" means the regenerative braking amount regen maintained in the regenerative braking continuation range "regen_cont".

First, when a preset deceleration condition is satisfied, the regenerative braking control unit 241 may determine traveling environment level based on a deceleration decel of the vehicle, a distance between a front obstacle (e.g., a front vehicle) according to a radar signal and a target vehicle, a slope of a ground, and a wheel braking amount "brk_wheel". The preset deceleration condition may be satisfied when the brake pedal operation amount (BPS) is greater than or equal to a preset value (e.g., when a driver decelerates the vehicle). The slope of the ground may be determined through at least one of a traction control system (TCS) and an anti-lock brake system (ABS).

The traveling environment level may represent the degree to which stable braking is required according to the traveling environments of the vehicle when the preset deceleration condition is satisfied. In other words, the regenerative braking control unit 241 may determine the traveling environment level based on whether the deceleration "decel" is greater than or equal to the preset deceleration, whether the distance between the front obstacle and the vehicle is greater than or equal to a preset distance, and whether the slope of the ground is greater than or equal to a preset slope, and whether the wheel braking amount "brk_wheel" is greater than or equal to a preset braking amount.

Referring to Equation 1 below, when the preset deceleration condition is satisfied, a traveling environment level (L) may be set to a value obtained by adding a first variable (a) according to the deceleration decel, a second variable (b) according to the distance with the front obstacle, a third variable (c) according to the slope of the ground, and a fourth variable (d) according to the wheel braking amount brk_wheel. Here, the first variable (a) may be set to zero '0' when the deceleration decel is smaller than the preset deceleration, and set to '1' when the deceleration decel is greater than or equal to the preset deceleration. The second variable (b) may be set to '0' when the distance with the front obstacle is greater than or equal to the preset distance, and set to '1' when the distance with the front obstacle is smaller than the preset distance. The third variable (c) may be set to '0' when the slope of the ground is smaller than the preset slope, and set to '1' when the slope of the ground is greater than or equal to the preset slope. The fourth variable (d) may be set to '0' when the wheel braking amount brk_wheel is smaller than the preset braking amount, and set to '1' when the wheel braking amount brk_wheel is greater than or equal to the preset braking amount.

$$L = a + b + c + d \quad \text{Equation 1:}$$

The regenerative braking control unit 241 may determine the regenerative braking continuation range "regen_cont" and the regenerative braking retention amount "regen_retent" according to the traveling environment level. More specifically, the regenerative braking control unit 241 may decrease the regenerative braking continuation range "regen_cont" and the regenerative braking retention amount "regen_retent" for stable braking as the traveling environment level increases. The regenerative braking continuation range (regen_cont) and the regenerative braking retention amount (regen_retent), which are changed depending on the traveling environment level, may be set based on hydraulic braking responsiveness.

The regenerative braking calculation unit 242 may calculate the regenerative braking amount regen based on a regenerative braking request amount (regen_req), a paddle shift operation, a vehicle speed, and the like, and output the calculated amount to the motor control unit 220. In addition, the regenerative braking calculation unit 242 may receive a regenerative braking execution amount (regen_exec) actually executed in the motor from the motor control unit 220, and transmit the received regenerative braking execution amount (regen_exec) to a hydraulic braking calculation unit 262 of the braking control unit 260.

When the vehicle speed is slower than or equal to the preset regenerative braking termination vehicle speed, the regenerative braking calculation unit 242 may determine whether to maintain the regenerative braking amount regen as the regenerative braking retention amount (regen_retent) according to whether the vehicle speed is included in the regenerative braking continuation range (regen_cont).

In one embodiment, when the vehicle speed is included in the regenerative braking termination range but not in the regenerative braking continuation range, the regenerative braking calculation unit 242 may decrease the regenerative braking amount regen so that the regenerative braking amount regen is replaced with the hydraulic braking amount hb for stable braking. On the other hand, when the vehicle speed is included in the regenerative braking continuation range regen_cont of the regenerative braking termination range, the regenerative braking calculation unit 242 may increase the regenerative braking energy in the regenerative braking termination range by maintaining the regenerative braking amount regen as the regenerative braking retention amount regen_retent.

Meanwhile, since it is difficult to control the regenerative braking as the torque control process of the motor for shifting is involved when a downshift is made immediately before the vehicle is stopped, the hybrid control unit 240 according to this embodiment may send a request to the transmission control unit 250 to prohibit a shift stage change of the transmission 150 when the vehicle speed is smaller than or equal to a preset shift prohibition vehicle speed. Accordingly, when receiving the shift prohibition request, the transmission control unit 250 may prohibit the shift stage change of the transmission 150 until the vehicle is stopped.

In addition, when the vehicle re-starts when the stop maintenance state lasts for a certain time after the vehicle is stopped, the hybrid control unit 240 according to this embodiment may request the downshift to the transmission control unit 250 for a launch effect. The hybrid control unit 240 then performs a re-acceleration control while maintaining the shift stage of the transmission 150 when the stop maintenance state does not last for the certain time after the vehicle is stopped. The re-acceleration control may include a control for increasing a creep torque at the maintained shift stage and a launch control through the first motor 120. Here, the launch control through the first motor 120 may mean a control that outputs the torque from the first motor 120 directly connected to the engine 110 together with starting the engine 110 in order to improve the sense of acceleration. The launch control controls the engine clutch 130 in a slip state so that the torques of the engine 110 and the first motor 120 are transmitted to an input terminal of the transmission 150 by the transmitted torque of the engine clutch 130.

The brake control unit 260 may include a request amount calculation unit 261 and a hydraulic brake calculation unit 262 configured to calculate a regenerative brake request amount (regen_req) and a hydraulic brake amount (hb), respectively, based on a brake demand amount according to the brake pedal operation amount (BPS).

The request amount calculation unit 261 may calculate the regenerative braking request amount (regen_req) based on the brake pedal operation amount (BPS), the motor state information and battery state information (SOC, temperature, and the like) transmitted from the motor control unit 220.

The hydraulic braking calculation unit 262 may control the hydraulic pressure braking to be implemented according to the hydraulic braking amount (hb) by calculating the hydraulic braking amount based on a difference between the braking demand amount according to the brake pedal operation amount (BPS) and the regenerative braking execution amount (regen_exec).

Figure 4:
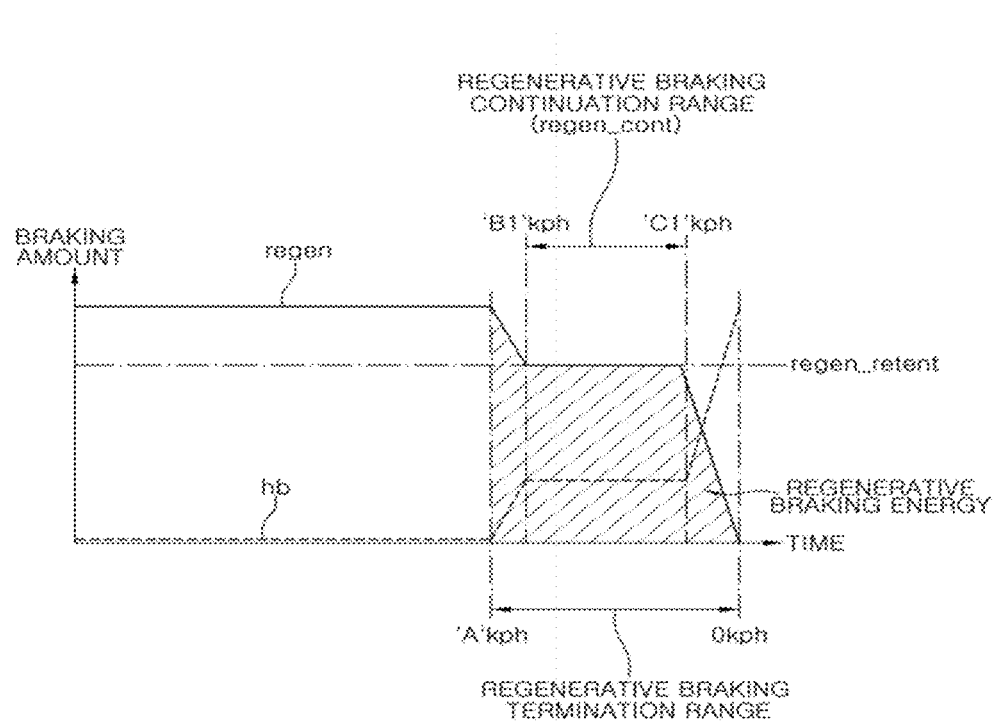
FIGS. 4 and 5 are schematic diagrams illustrating a process of controlling a braking amount according to traveling environments in the hybrid electric vehicle in one embodiment of the present disclosure.
Figure 5:
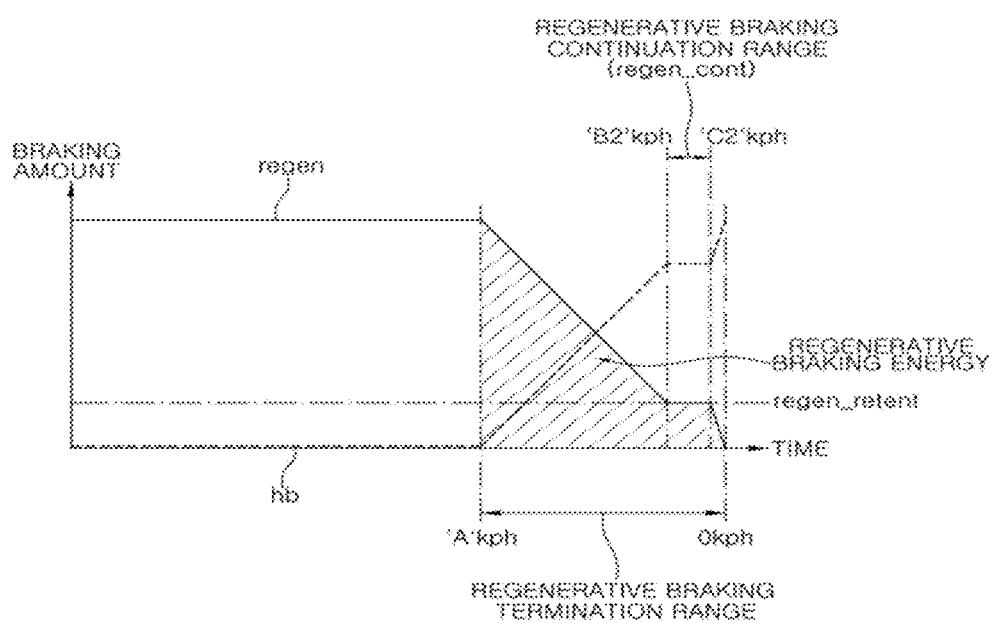

FIGS. 4 and 5 are schematic diagrams illustrating a process of controlling a braking amount according to traveling environments in the hybrid electric vehicle in one embodiment of the present disclosure. FIGS. 4 and 5 show a process of controlling the regenerative braking amount (regen) and the hydraulic braking amount (hb) at different traveling environment levels upon deceleration, and FIG. 4 shows a case in which a traveling environment level lower than a traveling environment level applied to FIG. 5 is applied.

Referring to FIG. 4, when the vehicle speed is decreased to a regenerative braking termination vehicle speed 'A' or less, the regenerative braking amount (regen) is replaced with the hydraulic braking amount (hb), so that the regenerative braking amount may be decreased and the hydraulic braking amount may be increased.

When the vehicle speed is between an entrance vehicle speed 'B1' and a termination vehicle speed 'C1.' in the regenerative braking continuation range, the regenerative braking amount (regen) may be maintained as the regenerative braking retention amount (regen_retent). Accordingly, the regenerative braking energy may be increased in the regenerative braking termination range.

When the vehicle speed is decreased to the termination vehicle speed 'C1.' in the regenerative braking continuation range, the regenerative braking amount regen is replaced with the hydraulic braking amount (hb), so that the regenerative braking amount (regen) may be decreased again, and the hydraulic braking amount (hb) may be increased again.

Referring to FIG. 5, when the vehicle speed is decreased to a regenerative braking termination vehicle speed 'A' or less, the regenerative braking amount (regen) is replaced with the hydraulic braking amount hb, so that the regenerative braking amount regen may be decreased and the hydraulic braking amount may be increased.

When the vehicle speed is between an entrance vehicle speed 'B2' and a termination vehicle speed 'C2' in the regenerative braking continuation range, the regenerative braking amount (regen) may be maintained as the regenerative braking retention amount (regen_retent). In FIG. 5, since a higher traveling environment level is applied than in FIG. 4, the regenerative braking continuation range (regen_cont) and the regenerative braking retention amount (regen_retent) may be set to be low for stable braking.

When the vehicle speed is decreased to the termination vehicle speed 'C2' or less in the regenerative braking continuation range, the regenerative braking amount is replaced with the hydraulic braking amount, so that the regenerative braking amount may be decreased again, and the hydraulic braking amount may be increased again.

Figure 6:
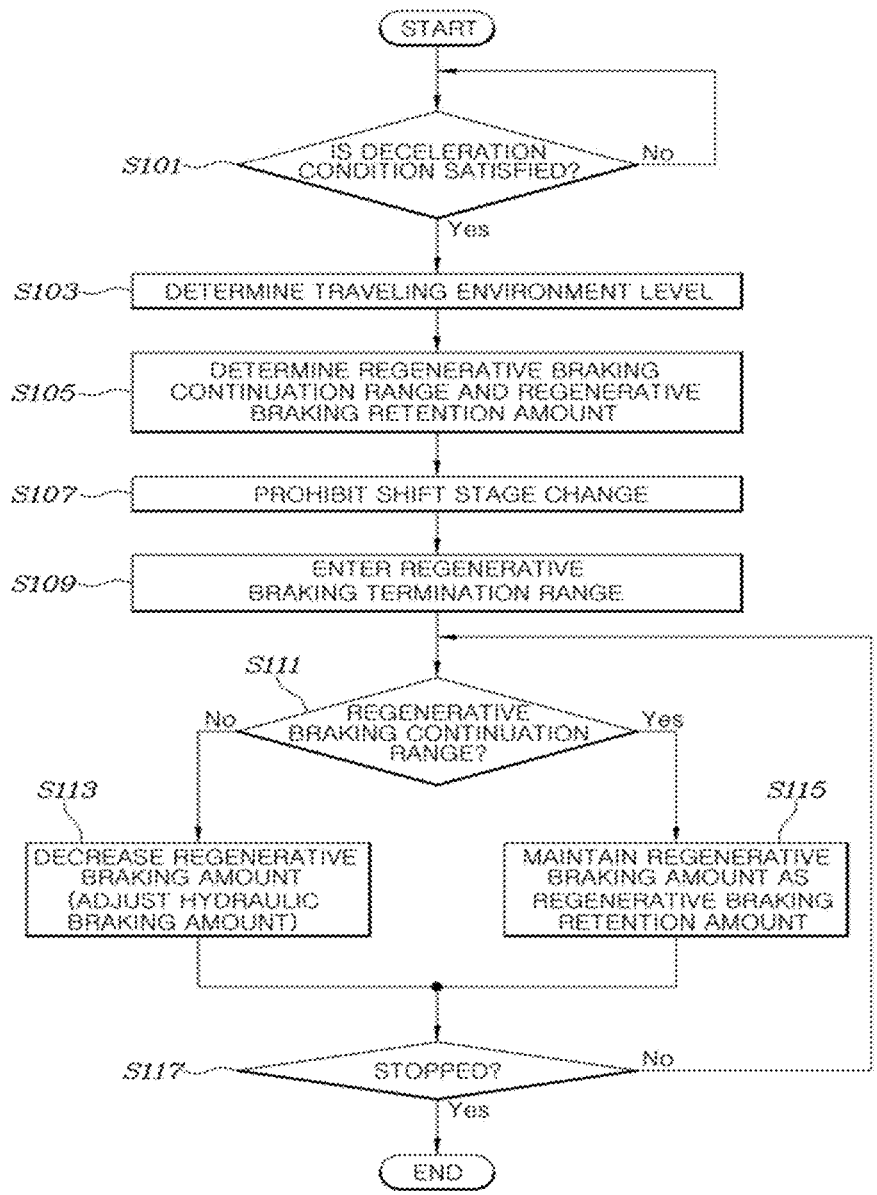
FIGS. 6 and 7 are flowcharts showing a method of controlling the hybrid electric vehicle according to one embodiment of the present disclosure.
Figure 7:
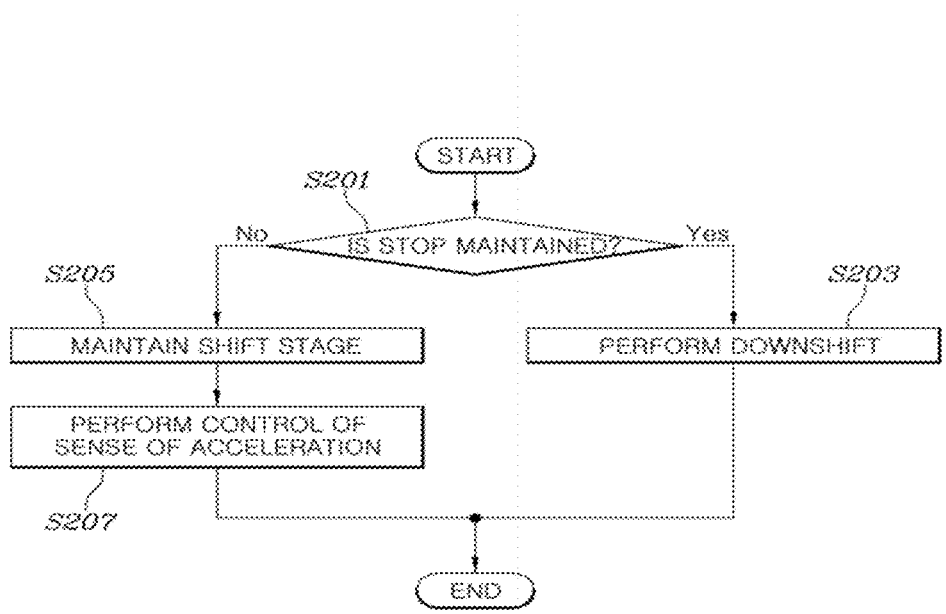

FIGS. 6 and 7 are flowcharts showing a method of controlling the hybrid electric vehicle according to one embodiment of the present disclosure. FIG. 6 shows a process in which the vehicle is stopped, and FIG. 7 shows a process in which the vehicle starts again in the stopped state.

FIG. 6 shows a situation in which regenerative braking is intervened based on a regenerative braking request amount (regen_req) greater than zero as the brake pedal is operated under a condition in which the regenerative braking may be performed.

Referring to FIG. 6, the regenerative braking control unit 241 may determine whether the preset deceleration condition is satisfied based on whether the brake pedal operation amount (BPS) is greater than or equal to a preset value (S101). When the preset deceleration condition is not satisfied (NO in S101), S101 may be performed again.

When the preset deceleration condition is satisfied (YES in S101), the regenerative braking control unit 241 may determine the traveling environment level based on the deceleration decel of the vehicle, the radar signal, the slope of the ground, and the wheel braking amount "brk_wheel" (S103). FIG. 6 shows that the determining of the traveling environment level (S103) is performed when the preset deceleration condition is satisfied (YES in S101), but according to the embodiment, the determining of the traveling environment level (S103) may be executed regardless of whether the preset deceleration condition is satisfied. For example, the determining of the traveling environment level (S103) may be executed in real time or every predetermined period.

The regenerative braking control unit 241 may determine the regenerative braking continuation range "regen_cont" and the regenerative braking retention amount "regen_retent" according to the determined traveling environment level (S105). At this time, when the vehicle speed is lower than or equal to the preset shift prohibition vehicle speed, the hybrid control unit 240 may send to the transmission control unit 250 a request for prohibiting the shift stage change of the transmission 150 until the vehicle is stopped (S107).

Thereafter, when the vehicle speed is lower than or equal to the regenerative braking termination vehicle speed, the regenerative braking calculation unit 242 may determine that the vehicle speed has entered the regenerative braking termination range (S109).

While the vehicle decelerates after the vehicle speed enters the regenerative braking termination range, the regenerative braking calculation unit 242 may determine whether to maintain the regenerative braking amount "regen" as the regenerative braking retention amount "regen_retent" based on whether the vehicle speed is included in the regenerative braking continuation range "regen_cont" (S111).

When the vehicle speed is not included in the regenerative braking continuation range (NO in S111), the regenerative braking calculation unit 242 may decrease the regenerative braking amount "regen" (S113). At this time, the hydraulic braking calculation unit 262 may control the hydraulic pressure braking to be implemented according to the hydraulic braking amount hb by calculating the hydraulic braking amount hb based on the difference between the braking demand amount according to the operation of the brake pedal and the regenerative braking execution amount "regen_exec". For example, the vehicle speed enters the regenerative braking termination range, but in the section in which the vehicle speed is higher (or lower) than the regenerative braking continuation range "regen_cont", the regenerative braking amount may decrease, and the hydraulic braking amount may be increased by the decreased amount of the regenerative braking amount regen as the hydraulic braking is intervened. Accordingly, when the vehicle speed is lower than the regenerative braking termination range, the regenerative braking is terminated, and the braking demand amount according to the operation of the brake pedal may be satisfied only through the hydraulic braking.

When the vehicle speed is included in the regenerative braking continuation range "regen_cont" (YES in S111), the regenerative braking calculation unit 242 may maintain the regenerative braking amount "regen" as the regenerative braking retention amount "regen_retent" (S115).

The regenerative braking calculation unit 242 may determine whether the vehicle is stopped (S117), and may re-perform S111, S113, and S115 until the vehicle is stopped.

Referring to FIG. 7, the hybrid control unit 240 may determine whether the stopped state of the vehicle is maintained for a certain time (S201).

When the stopped state of the vehicle is maintained for the certain time (YES in S201), the hybrid control unit 240 may request to the transmission control unit 250 the downshift for the launch effect when the vehicle restarts (S203).

When the stopped state of the vehicle is not maintained for the certain time (NO in S201), the hybrid control unit 240 may maintain the shift stage of the transmission 150 (S205), and perform the re-acceleration control (S207). As described above, the re-acceleration control may include the control for increasing the creep torque at the maintained shift stage and the launch control through the first motor 120.

Meanwhile, the above-described present disclosure may be implemented as computer-readable codes on a medium in which a program is recorded. The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device, and the like. Accordingly, the above detailed description should not be construed as being restrictive but should be considered as being illustrative in all respects. The scope of the present disclosure should be determined by a reasonable construction of the appended claims, and all modifications within the equivalent scope of the present disclosure are included in the scope of the present disclosure.

What is claimed is:

1. A method of controlling an electrified vehicle, the method comprising:
   determining a traveling environment level;
   determining a regenerative braking continuation range and a regenerative braking retention amount based on the traveling environment level when a preset deceleration condition is satisfied;
   decreasing the regenerative braking continuation range and the regenerative braking retention amount as the traveling environment level increases; and
   determining whether to maintain a regenerative braking amount as the regenerative braking retention amount based on whether a vehicle speed is included in the regenerative braking continuation range when the vehicle speed is lower than or equal to a preset regenerative braking termination vehicle speed,
   wherein determining whether to maintain the regenerative braking amount comprises:
      decreasing the regenerative braking amount when the vehicle speed is lower than or equal to the preset regenerative braking termination vehicle speed and the vehicle speed is not included in the regenerative braking continuation range,
   wherein decreasing the regenerative braking amount comprises:
      executing hydraulic braking based on a difference between a braking demand amount according to an operation of a brake pedal and a regenerative braking execution amount, and
   wherein the traveling environment level is determined based on at least one of a deceleration of the vehicle, a distance between a front obstacle and the vehicle, a slope of a ground, or a wheel braking amount, or a combination thereof.

2. The method of claim 1,
   wherein determining whether to maintain the regenerative braking amount comprises:
   maintaining the regenerative braking amount as the regenerative braking retention amount when the vehicle speed is included in the regenerative braking continuation range.

3. The method of claim 1,
   wherein the preset deceleration condition is satisfied when an operation amount of a brake pedal is greater than or equal to a preset value.

4. The method of claim 1,
   wherein when a deceleration is higher than or equal to a preset deceleration, the traveling environment level is set to be higher than when the deceleration is lower than the preset deceleration.

5. The method of claim 1,
   wherein when a distance between a front obstacle and a vehicle is smaller than a preset distance, the traveling environment level is set to be greater than when the distance between the front obstacle and the vehicle is greater than or equal to the preset distance.

6. The method of claim 1,
   wherein when a slope of a ground is greater than or equal to a preset slope, the traveling environment level is set to be greater than when the slope of the ground is smaller than the preset slope.

7. The method of claim 1,
   wherein when a wheel braking amount is greater than or equal to a preset braking amount, the traveling environment level is set to be greater than when the wheel braking amount is smaller than the preset braking amount.

8. The method of claim 1, further comprising: prohibiting a shift stage change of a transmission until a vehicle is stopped when the vehicle speed is less than or equal to a preset shift prohibition vehicle speed.

9. An electrified vehicle comprising:
   a hybrid control unit configured to:
      determine a regenerative braking continuation range and a regenerative braking retention amount based on a traveling environment level when a preset deceleration condition is satisfied,
      determine whether to maintain a regenerative braking amount as the regenerative braking retention amount based on whether a vehicle speed is included in the regenerative braking continuation range when the vehicle speed is lower than or equal to a preset regenerative braking termination vehicle speed; and
   a brake control unit configured to execute braking based on a difference between a braking demand amount according to an operation of a brake pedal and a regenerative braking execution amount,
   wherein the traveling environment level is determined based on at least one of a deceleration of the vehicle, a distance between a front obstacle and the vehicle, a slope of a ground, or a wheel braking amount, or a combination thereof, and wherein the hybrid control unit is configured to decrease the regenerative braking continuation range and the regenerative braking retention amount as the traveling environment level increases.

10. The electrified vehicle of claim 9, wherein the hybrid control unit is configured to:

maintain the regenerative braking amount as the regenerative braking retention amount when the vehicle speed is included in the regenerative braking continuation range, and decrease the regenerative braking amount when the vehicle speed is lower than or equal to the preset regenerative braking termination vehicle speed and the vehicle speed is not included in the regenerative braking continuation range.

11. The electrified vehicle of claim 9, wherein the preset deceleration condition is satisfied when an operation amount of a brake pedal is greater than or equal to a preset value.

12. The electrified vehicle of claim 9, wherein when a deceleration is higher than or equal to a preset deceleration, the hybrid control unit is configured to set the traveling environment level to be higher than when the deceleration is lower than the preset deceleration.

13. The electrified vehicle of claim 9, wherein when a distance between a front obstacle and a vehicle is less than a preset distance, the hybrid control unit is configured to set the traveling environment level to be greater than when the distance between the front obstacle and the vehicle is greater than or equal to the preset distance.

14. The electrified vehicle of claim 9, wherein when a slope of a ground is greater than or equal to a preset slope, the hybrid control unit is configured to set the traveling environment level to be greater than when the slope of the ground is less than the preset slope.

15. The electrified vehicle of claim 9, wherein when a wheel braking amount is greater than or equal to a preset braking amount, the hybrid control unit is configured to set the traveling environment level to be greater than when the wheel braking amount is smaller than the preset braking amount.

16. The electrified vehicle of claim 9, further comprising:

a transmission; and a transmission control unit configured to prohibit a shift stage change of the transmission until a vehicle is stopped when the vehicle speed is lower than or equal to a preset shift prohibition vehicle speed.

* * * * *